United States Patent [19] [11] Patent Number: 5,329,635
Wadin et al. [45] Date of Patent: Jul. 12, 1994

[54] SEAMLESS HANDOFF FOR RADIO TELEPHONE SYSTEMS

[75] Inventors: Craig P. Wadin, Sunrise; Stelios J. Patsiokas, Plantation; Paul D. Marko, Ft. Lauderdale, all of Fla.

[73] Assignee: Motorola, Inc., Schaumburg, Ill.

[21] Appl. No.: 881,975

[22] Filed: May 12, 1992

[51] Int. Cl.$^5$ .......................... H04Q 7/02; H04J 3/16
[52] U.S. Cl. .................................. 455/33.2; 455/56.1; 455/67.1; 379/60; 370/95.3
[58] Field of Search ...................... 455/33.1, 33.2, 33.4, 455/38.2, 54.1, 54.2, 56.1, 62, 67.1, 67.3, 67.7, 343; 379/58, 59, 63; 370/95.1, 95.3

[56] References Cited

U.S. PATENT DOCUMENTS 4,964,121 10/1990 Moore ................................ 455/343
5,157,661 10/1992 Kanai et al. ........................ 370/95.1
5,159,593 10/1992 D'Amico et al. .................. 370/95.3

Primary Examiner—Reinhard J. Eisenzopf
Assistant Examiner—Lisa Charouel
Attorney, Agent, or Firm—Thomas G. Berry; Daniel R. Collopy; Pablo Meles

[57] ABSTRACT

A method for seamless transfer of a communication link from a first radio telephone base station to a second radio telephone base station comprises the following steps performed at the first base station: (100) receiving a communication link request from a calling portable radio unit; (102) synchronizing with the calling portable radio unit; (104) determining whether the calling radio has handoff authorization; (108) connecting received data to a second base to allow for synchronization to the calling radio; (112) measuring a first RSSI level at the first base station for the calling radio; (114) determining whether the first RSSI level for the calling radio is below a first handoff threshold; (116) determining a second RSSI level for the calling radio, as measured at the second base station, is above a second handoff threshold, if the first RSSI level for the calling portable radio unit is below the first handoff threshold, (118) determining whether the second RSSI level for the calling portable radio unit is above a second handoff threshold, and (120) alerting the second base station to pick up the communication link. The method further comprises the following step performed at a second base station: (122) commencing to transmit in the frame immediately following the last transmit frame of the first base.

9 Claims, 3 Drawing Sheets

SEAMLESS HANDOFF FOR RADIO TELEPHONE SYSTEMS

TECHNICAL FIELD

This invention relates generally to communications electronics, and more specifically, to radio telephones.

BACKGROUND

Present second generation cordless telephone (also known as CT2 or telepoint) systems in accordance with the CT2 Common Air Interface (CAI, the regulations governing the CT2 communication systems) do not provide the ability for the users of the handsets to roam away from the base station on which the communication link was established. One way to provide such roaming capability would be to re-establish the communication link with a second base station when the handset moves out of the range of a first base (on which the initial link was established). This approach, however, would probably not be transparent to the handset user because an audible "seam" would occur when the link is re-established. A need thus exists for a "seamless handoff" in CT2 systems and other similar radio telephone systems.

SUMMARY OF THE INVENTION

Briefly, according to the invention, in a time-division duplex radio communication system comprising a plurality of base stations and portable radio units communicating on a plurality of alternating transmit and receive frames, a method for seamless transfer of a communication link from a first base station to a second base station comprises the following steps performed at the first base station:

(1) receiving a communication link request from a calling portable radio unit;

(2) synchronizing with the calling portable radio unit; determining whether the calling portable radio unit has handoff authorization;

(3) connecting received data to a transceiver in a second base to allow synchronization to the calling portable radio;

(4) measuring a first RSSI level at the first base station for the calling portable radio unit;

(5) determining whether the first RSSI level for the calling portable radio unit is below a first handoff threshold;

(6) determining a second RSSI level for the calling portable radio unit, as measured at the second base station, is above a second handoff threshold, if the first RSSI level for the calling portable radio unit is below the first handoff threshold, (7) determining whether the second RSSI level for the calling portable radio unit is above a second handoff threshold, and (8) alerting the second base station to pick up the communication link when the first RSSI level is below the first handoff threshold and the second RSSI level is above a second handoff threshold.

The method further comprises the following steps performed at a second base station that is receiving the link handoff:

(1) receiving the alert to pick up the communication link; and (2) commencing to transmit in the frame immediately following the last transmit frame of the first base.

DETAILED DESCRIPTION OF THE PREFERRED EMBODIMENT

Figure 1:
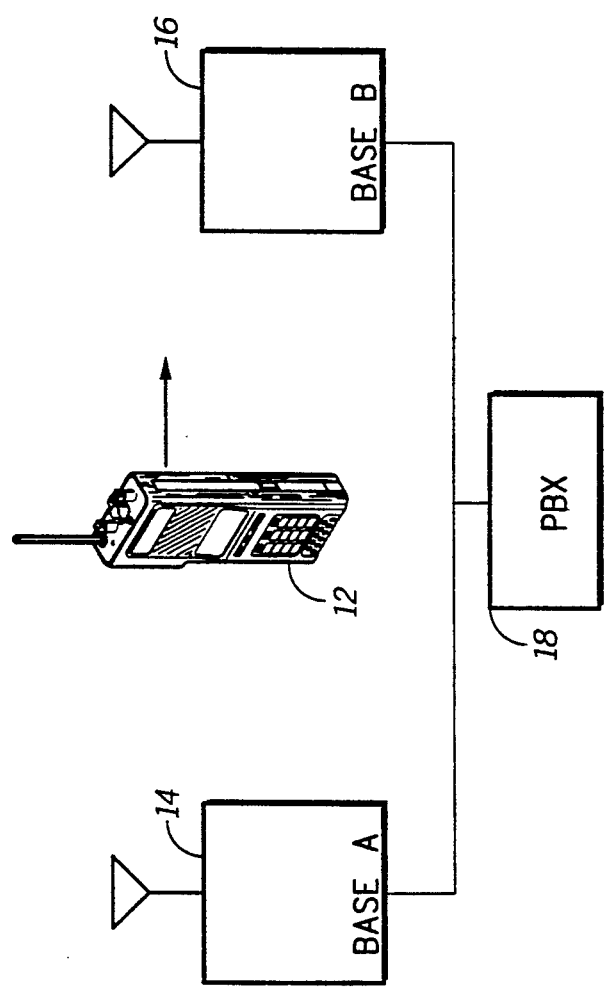
FIG. 1 is a block diagram of a portable radio system in accordance with the invention.

Referring to FIG. 1, there is shown a block diagram of a radio telephone system 10 in accordance with the invention. The radio telephone system 10, preferably a second generation cordless telephone (CT2) system, comprises a CT2 handset 12, a first base station 14, a second base station 16, and a PBX 18 linking the system together. The CT2 system is a time-division duplex system having a plurality of alternating transmit and receive frames. Each frame has a duration of one millisecond.

Figure 2:
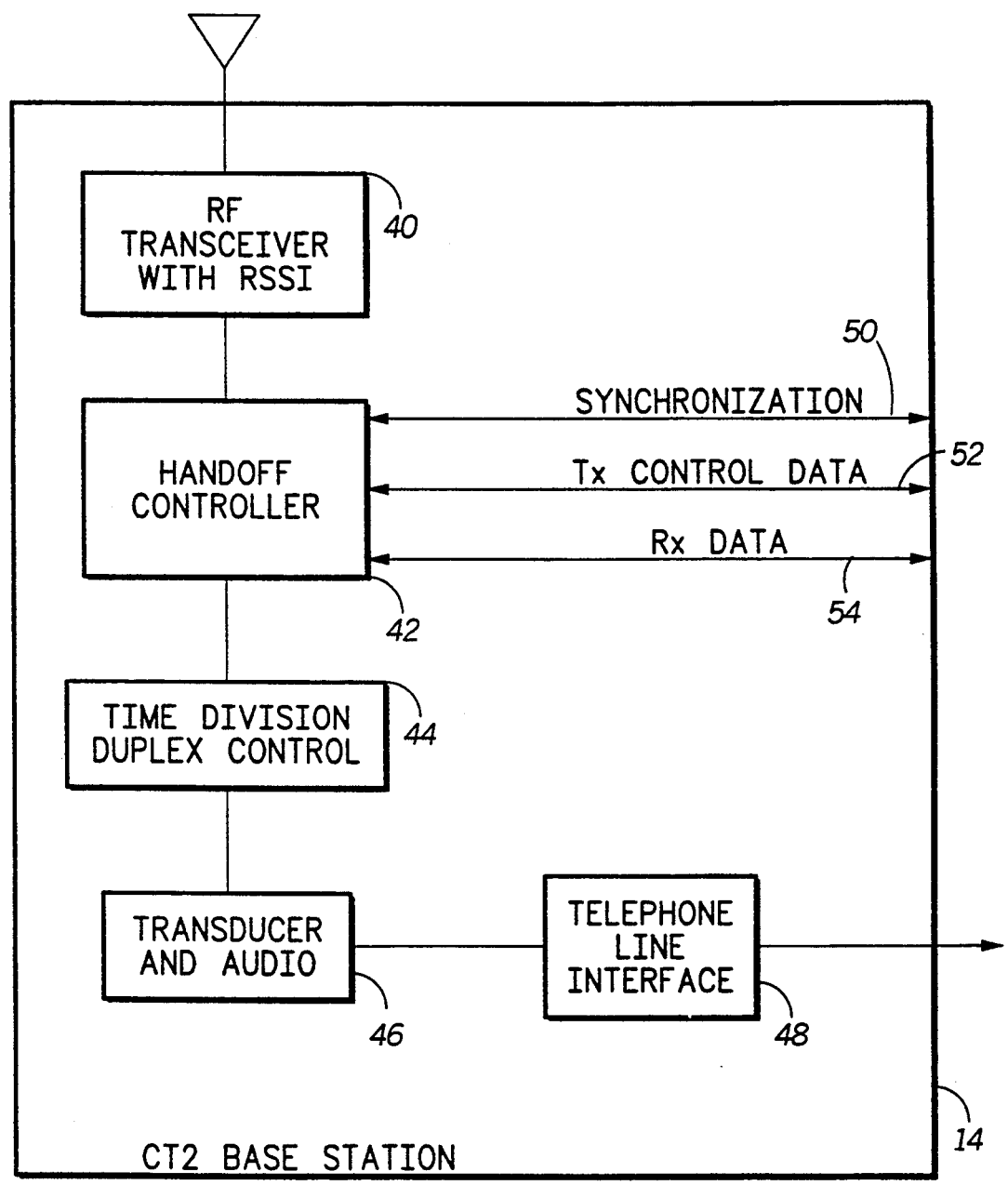
FIG. 2 is a simplified block diagram of a CT2 base station in accordance with the invention.

Referring to FIG. 2, there is shown a simplified block diagram of CT2 base station 14 of FIG. 1. The base station 14 comprises a conventional CT2 radio frequency transceiver having a received signal strength indicator (RSSI). The transceiver 40 is coupled to a handoff controller 42 which preferably comprises a microprocessor programmed in accordance with the invention. A time division duplex control 44 is coupled to the handoff controller to control the TDD operation of the base 14 in accordance with the CAI. A transducer and audio section 46 handles the audio signals in the base station 14, and a telephone line interface 48 allows communication via telephone lines. The handoff controller includes several data lines which are connected to the CT2 communication system via the PBX 18. These lines include a synchronization line 50, for synchronizing with other communication units in the CT2 system, a Tx control data path 52, for controlling transmission of data, and an Rx data line 54 for receiving data from other communication units.

When the subscriber unit 12 initiates a link request, the base 14 uses the information contained in the handset link request signal identification (ID) field to determine if the handset 12 has handoff authorization. If the handset 12 is authorized for handoff, the base 14 connects the received data path to its assigned neighbor base 16 transceiver.

Communication is established with base 14 and, simultaneously, the base 16 transceiver also uses the receive data provided by base 14 to acquire bit level synchronization to the handset 12. Base 14 uses the transmit control data path (52) to disable the base 16 transmitter.

Base 14 continuously monitors the handset RSSI threshold level to determine if handoff is to take place. Base 16 also monitors for the handset RSSI level and uses the transmit control data path to indicate to base 14 if the RSSI level that it is monitoring from the handset is above the RSSI threshold programmed in it.

When the handset RSSI level drops below a predetermined threshold value, base 14 uses the transmitter control data path (52) to determine if the transceiver of base 16 is receiving an RSSI level from the handset that is above the handoff level. If base 16 indicates that the handset RSSI level is above the threshold level, at the point where the next base transmit frame starts, base 14 drops its transmitter and base 16 enables its transmitter. At this point handoff is complete. The ability to control transmit activity on a frame basis allows for totally seamless handoff.

Figure 3:
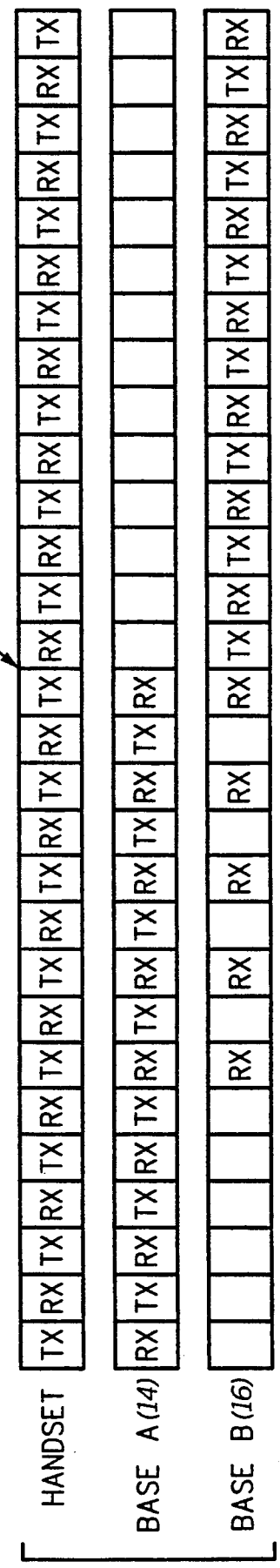
FIG. 3 is a shows the transmit/receive sequences of the handset and base stations of FIG. 1.

Referring to FIG. 3, there is shown the transmit/receive sequences of the handset and base stations of FIG. 1. The handset 12 is operating in the well-known CT2 TDD mode comprising a series of alternating receive and transmit one millisecond frames. Base stations 14 and 16 are shown to be synchronized with handset 12. The transmitter of base 16 is, however, disabled until the handoff is made. As is shown, base 16 commences to transmit in the next transmit frame following the last transmit frame of the base 14.

If base 16 indicates that the handset RSSI level is below the handoff threshold base 14 sends a warning tone to the handset user to indicate to him that he is approaching the end of available coverage.

The use of the data link between base transceivers allows for synchronization of receivers. The RSSI level monitoring of these receivers provide tracking of the portable unit from cell to cell.

The transmitter control for each transceiver is enabled and disabled based on an adjustable RSSI level. This transmitter control simultaneously drops one transmitter and enables the transmitter with which the handset communications was being handed off to. This is transparent to the handset user. The ability to program the handoff RSSI threshold level on a base by base basis allows for flexibility in determining the point of handoff depending on the individual base station locations propagation characteristics.

The authorization for handoff is passed from the handset 12 to the base 14 during initial link establishment in the Link ID field. This allows for a business system to determine which handset users need handoff. The phone line handoff is controlled through a PBX feature which provides phone lines to the base station in parallel as required.

Figure 4:
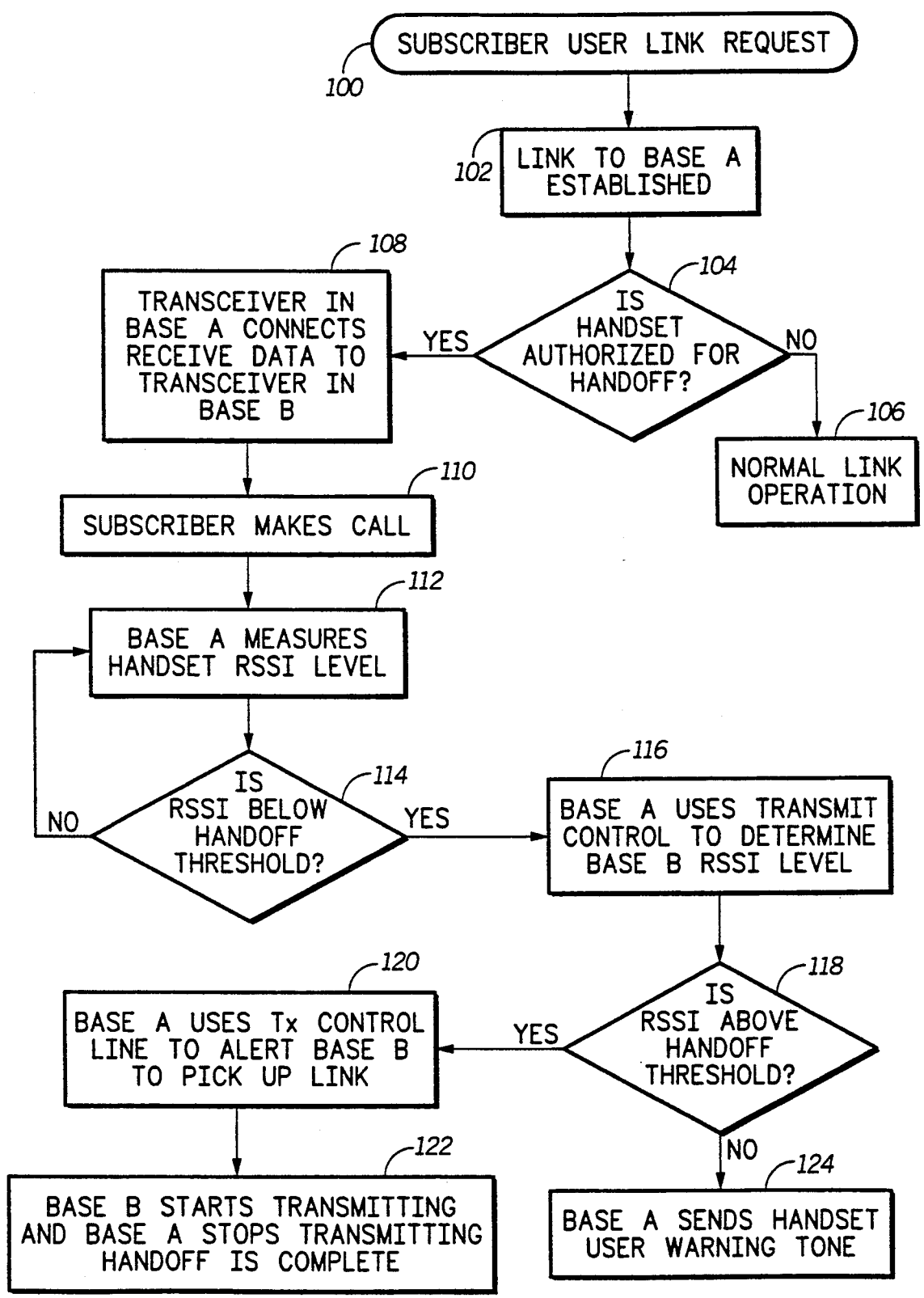
FIG. 4 is a flow diagram of a method in accordance with the invention.

Referring to FIG. 4, there is shown a flow diagram of a method in accordance with the invention. In step 100 a calling handset transmits a link request signal. In step 102 base A (14) receives the link request and grants the requested communication link. A decision 104 is then made to determine whether the handset is authorized for handoff. If decision 104 is negative, normal link operation commences in step 106.

If decision 104 is affirmative, the transceiver in the base 14 connects the receive data to the transceiver in base 16 at step 108. It step 110, the subscribed using handset 12 makes a call. In step 112, base 12 measures the RSSI level for the handset 12.

In decision 114, it is determined whether the RSSI measured in step 112 is below a handoff threshold. The handoff threshold is set to assure a quality link. If decision 114 is negative, the process returns to step 112. If decision 114 is affirmative, in step 116 base 12 uses its transmit control to determined the RSSI level of handset 12 as measured at base 16.

In decision 118 it is determined whether the RSSI is above the handoff threshold. The handoff threshold of decision 118 can be the same as, less than, or greater than the threshold of decision 114. If decision 118 is negative, in step 124 base 14 sends the handset user a warning tone. If decision 118 is affirmative, in step 120, base 14 uses the Tx control line to alert base 16 to pick up the communication link. Then in step 122, base 16 starts transmitting and base 14 stops transmitting. Handoff is complete at this point.

Thus, the ability to enable and disable the transmitter of two transceivers, that are both synchronized with the same handset, provides seamless handoff to the handset user. Moreover, this is accomplished at the base station level, without the requiring modification of the handset's software.

What is claimed is:

1. In a time-division duplex radio communication system comprising a plurality of base stations and portable radio units communicating on a plurality of alternating transmit and receive frames, a method for seamless transfer of a communication link from a first base station to a second base station comprising the steps of:

at the first base station;

receiving a communication link request from a calling portable radio unit;

synchronizing with the calling portable radio unit determining whether the calling portable radio unit has handoff authorization;

connecting received data to a transceiver in the second base station to allow for bit level synchronization to the calling portable radio unit;

measuring a first RSSI level at the first base station for the calling portable radio unit;

determining whether the first RSSI level for the calling portable radio unit is below a first handoff threshold;

determining a second RSSI level for the calling portable radio unit, as measured at the second base station, if the first RSSI level for the calling portable radio unit is below the first handoff threshold, determining whether the second RSSI level for the calling portable radio unit is above a second handoff threshold;

if the first RSSI level is below the first handoff threshold and the second RSSI level is above the second handoff threshold, alerting the second base station to pick up the communication link;

at the second base station:

synchronizing with the calling portable radio unit;

receiving the alert to pick up the communication link from the first base station; and commencing to transmit in a next transmit frame of the second base station following a last transmit frame of the first base station.

2. The method of claim 1 further comprising the step of:

re-measuring the first RSSI level at the first base station, if the first RSSI level at the first base station for the calling portable radio unit is not below the first handoff threshold.

3. The method of claim 1 further comprising the step of:

assuming normal communication link operation with the first base station, when the calling portable radio unit lacks handoff authorization.

4. The method of claim 1 further comprising the step of:

sending a warning tone from the first base station to the calling portable radio unit, when the second RSSI level is not above the second handoff threshold.

5. The method of claim 1, wherein the first handoff threshold is greater than the second handoff threshold.

6. The method of claim 1, wherein the first handoff threshold is less the second handoff threshold.

7. The method of claim 1, wherein the first handoff threshold is equal to the second handoff threshold.

8. A time-division duplex radio communication system comprising:

a plurality of base stations and portable radio units communicating on a plurality of alternating transmit and receive frames, each of the plurality of base stations comprising:

receiver means for receiving a communication link request from a calling portable radio unit;

synchronization means, coupled to the receiver means, for synchronizing with the calling portable radio unit;

means, coupled to the receiver means, for determining whether the calling portable radio unit has handoff authorization;

means for connecting received data to a transceiver in another of the plurality of base stations to allow synchronization to the calling portable radio;

means for measuring a first RSSI level for the calling portable radio unit;

means for determining whether the first RSSI level for the calling portable radio unit is below a handoff threshold;

means for determining a second RSSI level, as measured at the another of the plurality of base stations for the calling portable radio unit, if the first RSSI level for the calling portable radio unit is below the handoff threshold, means for determining whether the second RSSI level for the calling portable radio unit is above the handoff threshold; and means for commencing to transmit in a next transmit frame of the another of the plurality of base stations following a last transmit frame of one of the plurality of base stations that is handing off a communication link to the another of the plurality of base stations.

9. In a time-division duplex radio communication system comprising a plurality of base stations and portable radio units communicating on a plurality of alternating transmit and receive frames, a method for seamless transfer of a communication link from a first base station to a second base station, the first base station comprising:

receiver means for receiving a communication link request from a calling portable radio unit;

synchronization means, coupled to the receiver means, for synchronizing with the calling portable radio unit;

means, coupled to the receiver means, for determining whether the calling portable radio unit has handoff authorization;

means for connecting received data to a transceiver in the second base station to allow synchronization to the calling portable radio;

means for measuring a first RSSI level for the calling portable radio unit;

means for determining whether the first RSSI level for the calling portable radio unit is below a handoff threshold;

means for determining a second RSSI level, as measured at the second base station, for the calling portable radio unit, if the first RSSI level for the calling portable radio unit is below the handoff threshold, means for determining whether the second RSSI level for the calling portable radio unit is above the handoff threshold; and means for connecting to transmit in a next transmit frame of the second base station following a last transmit frame of the first station that is handing off the communication link.

* * * * *

UNITED STATES PATENT AND TRADEMARK OFFICE
CERTIFICATE OF CORRECTION

PATENT NO.   : 5,329,635
DATED        : July 12, 1994
INVENTOR(S)  : Craig P. Wadin, Stelios J. Patsiokas, Paul D. Marko It is certified that error appears in the above-indentified patent and that said Letters Patent is hereby corrected as shown below:

Column 4, line 68, delete "the" and insert --than the--.

Column 6, line 34, delete "connecting" and insert --commencing--.

Signed and Sealed this

Twenty-fourth Day of January, 1995

Attest:

BRUCE LEHMAN

*Attesting Officer*    Commissioner of Patents and Trademarks